United States Patent
Riddell et al.

(10) Patent No.: US 8,595,931 B2
(45) Date of Patent: Dec. 3, 2013

(54) LIFT SYSTEM AND METHOD FOR CONSTRUCTING A WIND TURBINE

(75) Inventors: Scott Gabell Riddell, Greer, SC (US); Qi Zhu, Simpsonville, SC (US); Matthew Nathan Crawfoot, Newport News, VA (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 13/214,605

(22) Filed: Aug. 22, 2011

(65) Prior Publication Data

US 2012/0027561 A1 Feb. 2, 2012

(51) Int. Cl.
B21D 53/78 (2006.01)
(52) U.S. Cl.
USPC ............. 29/889.6; 294/67.1; 294/74; 416/62; 416/63; 416/119; 416/244 R
(58) Field of Classification Search
USPC .................. 29/428, 889.6; 294/67.1, 74, 77; 416/62, 63, 119, 142, 146 R, 244 R
See application file for complete search history.

(56) References Cited

U.S. PATENT DOCUMENTS

| | | | |
|---|---|---|---|
| 8,033,791 B1 * | 10/2011 | Watanabe | 416/146 R |
| 2007/0266538 A1 | 11/2007 | Bervang | |
| 2008/0078128 A1 * | 4/2008 | Livingston et al. | 52/40 |
| 2009/0025219 A1 | 1/2009 | Hansen et al. | |
| 2010/0018055 A1 | 1/2010 | Lynderup et al. | |
| 2010/0028152 A1 | 2/2010 | Numajiri et al. | |
| 2010/0139062 A1 | 6/2010 | Reed et al. | |
| 2012/0098283 A1 * | 4/2012 | Maj et al. | 294/67.1 |

FOREIGN PATENT DOCUMENTS

WO WO 2010/147480 12/2010
WO 2011/050999 A1 5/2011

OTHER PUBLICATIONS

Search Report issued in connection with EP Application No. 12180185.6, Oct. 17, 2012.

* cited by examiner

*Primary Examiner* — Richard Chang
(74) *Attorney, Agent, or Firm* — Dority & Manning, P.A.

(57) ABSTRACT

A lift system and a method for constructing a wind turbine are disclosed. The lift system includes a rotor blade having exterior surfaces defining a pressure side, a suction side, a leading edge, and a trailing edge extending in a generally span-wise direction between a tip and a root. The lift system further includes a lift device including a sling and a quick release device. The sling is coupled to the rotor blade and includes a first end and a second end spaced apart by an intermediate portion. The second end is releasably joined to the first end by the quick release device. The quick release device is operable to release the second end from the first end to uncouple the sling from the rotor blade.

20 Claims, 7 Drawing Sheets

LIFT SYSTEM AND METHOD FOR CONSTRUCTING A WIND TURBINE

FIELD OF THE INVENTION

The present disclosure relates in general to wind turbines, and more particularly to lift systems and methods for constructing wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The typical construction of a wind turbine involves erecting the tower and then connecting various other components to the erected tower. For example, the rotor blades may be lifted to an appropriate height and connected to the tower after erection of the tower. In some cases, each of the rotor blades is connected to a hub before lifting, and the connected rotor blades and hub are then lifted and connected to the tower as a unit.

Current methods and apparatus for lifting the rotor blades involve the use of cranes. Typically, a main crane lifts a rotor blade or a plurality of rotor blades connected to a hub to the appropriate height. These components are then connected to the tower, and the main crane is then disconnected from the components.

In some cases, an auxiliary crane, sometimes referred to as a tail crane or tail pick crane, is additionally utilized. The auxiliary crane is connected to a rotor blade to control movement of the rotor blade during lifting, thus preventing the rotor blade from striking the tower or the ground or otherwise damaging any wind turbine components. To disconnect the auxiliary crane from the rotor blade, the cables coupled to the rotor blade are slid in a generally span-wise direction towards and past the tip of the rotor blade. As the cables pass the tip, the auxiliary crane is disconnected from the rotor blade.

However, disconnecting the auxiliary crane from the rotor blade in this fashion can have disadvantages, and may damage the rotor blade. For example, current advances in rotor blade technology have led to the installation of various blade appendages, such as noise reducers, lightning receptors, and vortex generators, on the exterior of the rotor blades. When the cables of the auxiliary crane are slid in the generally span-wise direction, the cables may encounter and contact these appendages. Such contact can damage the appendages and the exterior surfaces of the rotor blade.

Thus, an improved lift system and method for constructing a wind turbine are desired in the art. For example, a lift system and method that may prevent rotor blade damage during lifting and connecting of the rotor blades would be advantageous.

BRIEF DESCRIPTION OF THE INVENTION

Aspects and advantages of the invention will be set forth in part in the following description, or may be obvious from the description, or may be learned through practice of the invention.

In one embodiment, a lift system for a wind turbine is disclosed. The lift system includes a rotor blade having exterior surfaces defining a pressure side, a suction side, a leading edge, and a trailing edge extending in a generally span-wise direction between a tip and a root. The lift system further includes a lift device including a sling and a quick release device. The sling is coupled to the rotor blade and includes a first end and a second end spaced apart by an intermediate portion. The second end is releasably joined to the first end by the quick release device. The quick release device is operable to release the second end from the first end to uncouple the sling from the rotor blade.

In another embodiment, a method for constructing a wind turbine is disclosed. The method includes coupling a sling to a rotor blade. The rotor blade has exterior surfaces defining a pressure side, a suction side, a leading edge, and a trailing edge extending in a generally span-wise direction between a tip and a root. The sling includes a first end and a second end spaced apart by an intermediate portion, the second end releasably joined to the first end. The method further includes lifting the rotor blade, and releasing the second end of the sling from the first end such that the sling is uncoupled from the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
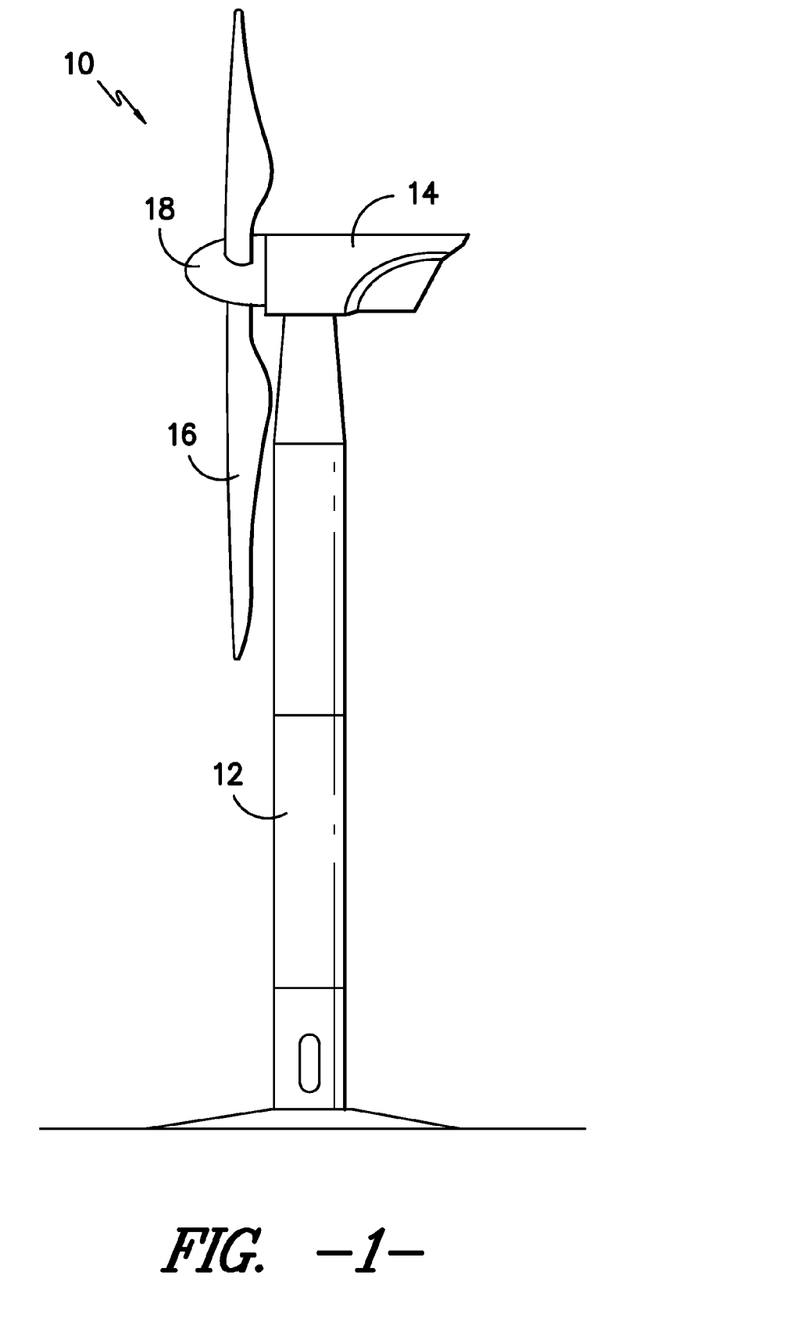
FIG. 1 is a perspective view of a wind turbine according to one embodiment of the present disclosure.

FIG. 1 illustrates a wind turbine 10 of conventional construction. The wind turbine 10 includes a tower 12 with a nacelle 14 mounted thereon. A plurality of rotor blades 16 are mounted to a rotor hub 18, such as via the roots (discussed below) of the rotor blades, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
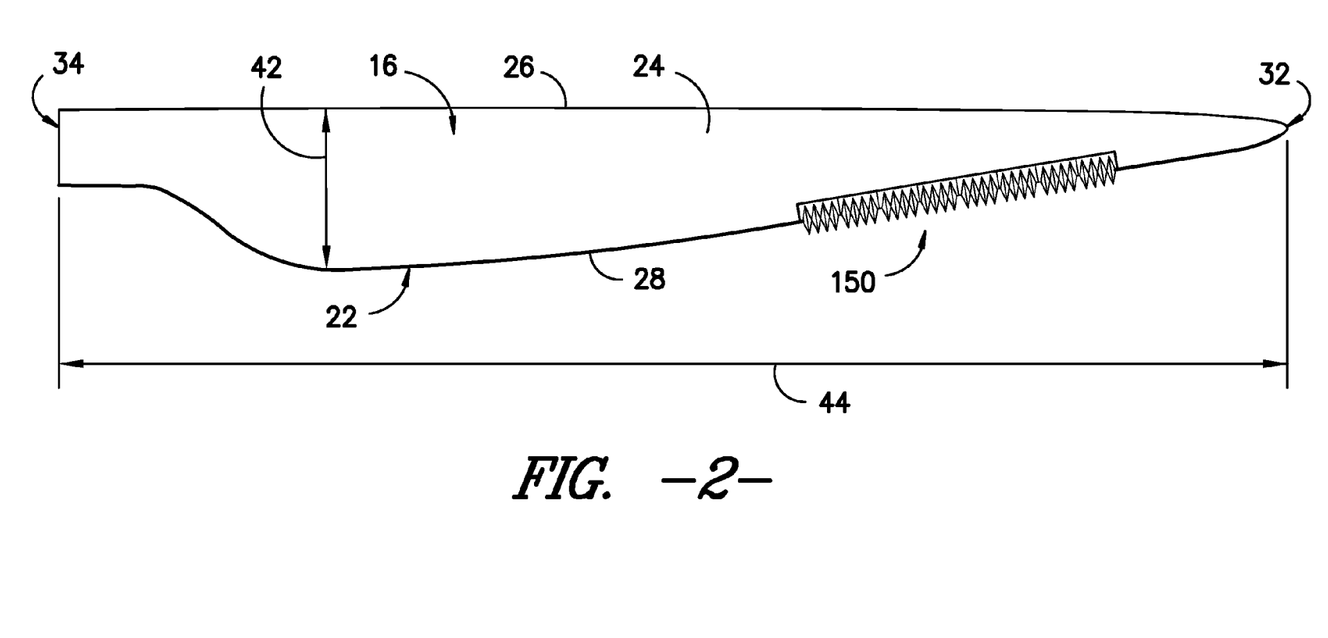
FIG. 2 is a top view of a rotor blade assembly according to one embodiment of the present disclosure.

Referring to FIG. 2, a rotor blade 16 according to the present disclosure may include exterior surfaces defining a pressure side 22 and a suction side 24 (see FIGS. 3 through 5 and 7) extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord may be defined for the rotor blade 16 at any point on the rotor blade 16 along the span 44. The exterior surfaces, as discussed above, may extend in the generally span-wise direction between the tip 32 and root 34.

Figure 3:
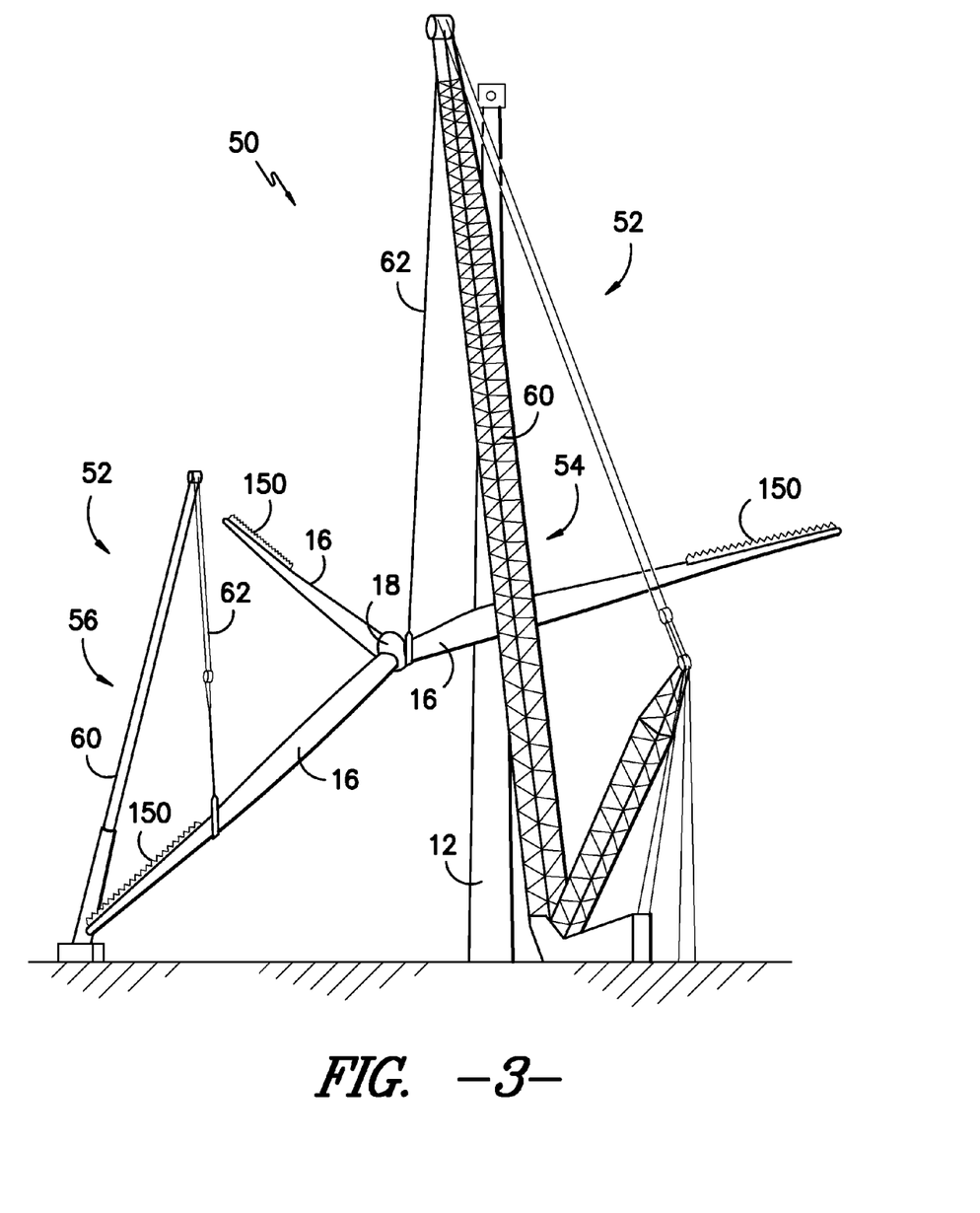
FIG. 3 is a perspective view of a lift system according to one embodiment of the present disclosure.

FIGS. 3 through 8 illustrated various embodiments of a lift system 50 of the present disclosure. As shown in FIG. 3 the lift system 50 includes at least one rotor blade 16. Further, in some embodiments, the lift system 50 includes a plurality of rotor blades 16. The root 34 of each of the rotor blades 16 may be mounted to the hub 18, as shown in FIGS. 1 and 3. The lift system 50 further includes at least one lift device 52. Further, in some embodiments, the lift system 50 includes a plurality of lift devices 52. For example, FIG. 3 illustrates a main lift device 54 and an auxiliary lift device 56. The main lift device 54 is coupled to the hub 18, while the auxiliary lift device 56 is coupled to a rotor blade 16. It should further be understood that the present lift system 50 may include more than one main lift device 54, auxiliary lift device 56, or other suitable lift device 52.

As shown, a lift device 52 may include a crane 60 and a crane cable 62. The crane 60 may be any suitable machine for generally lifting equipment and/or materials, such as a mobile crane, a floating crane, an aerial crane, or a fixed crane (such as a tower crane), as is generally known in the art. The crane cable 62 may be connected to the crane 60, and the crane 60 may control movement of the crane cable 62, as is generally known in the art.

A lift device 52 according to the present disclosure may further include a sling 64 and a quick release device 66. In embodiments wherein the lift device 52 includes a crane 60 and crane cable 62, the crane cable 62 may further be connected to the sling 64 and/or the quick release device 66, such that movement of the crane cable 62 moves the sling 64 and quick release device 66.

Figure 6:
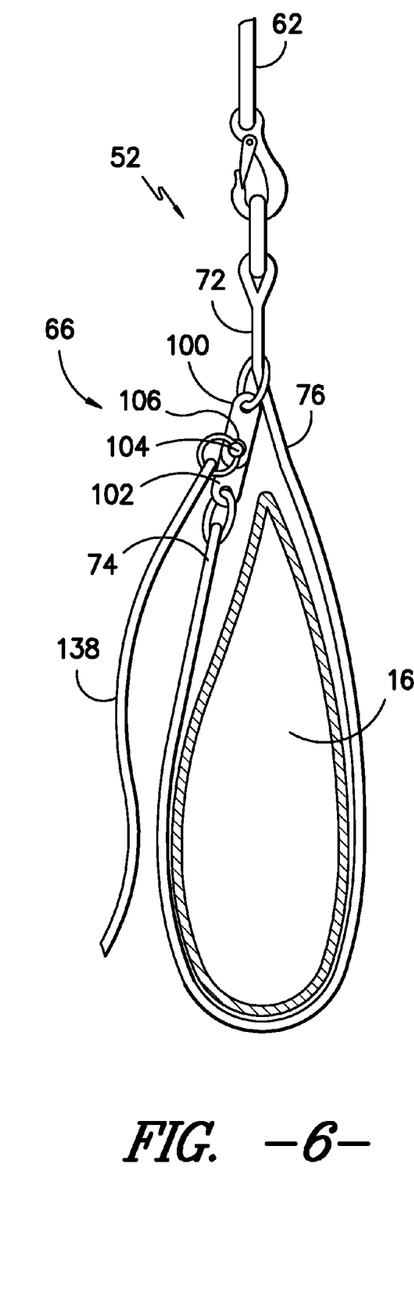
FIG. 6 is a cross-sectional view of a lift system according to another embodiment of the present disclosure.
Figure 7:
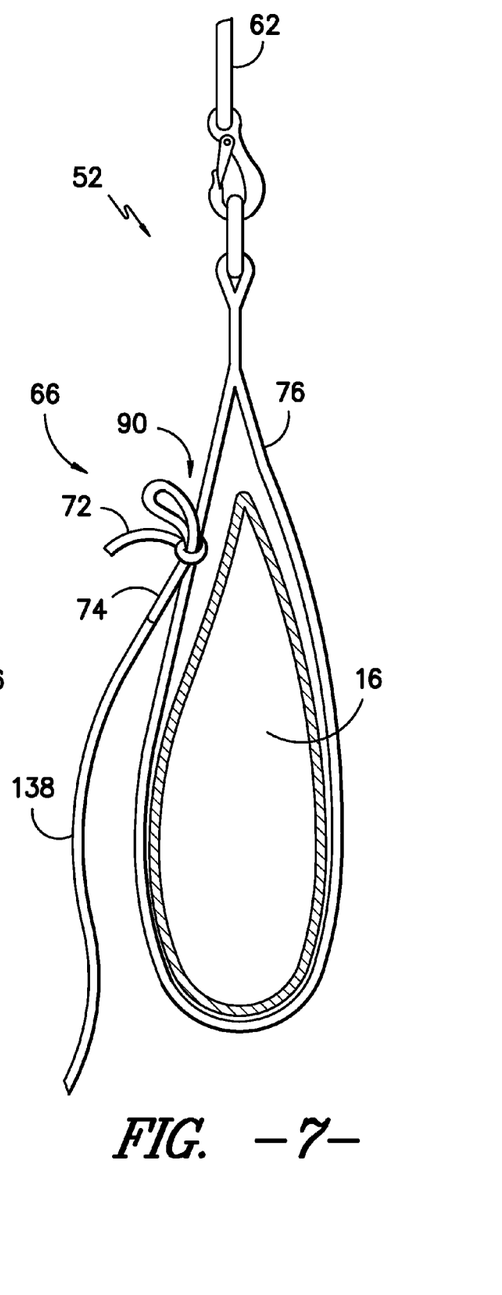
FIG. 7 is a cross-sectional view of a lift system according to another embodiment of the present disclosure; and, FIG. 8 is a perspective view of a lift system according to another embodiment of the present disclosure.
Figure 8:
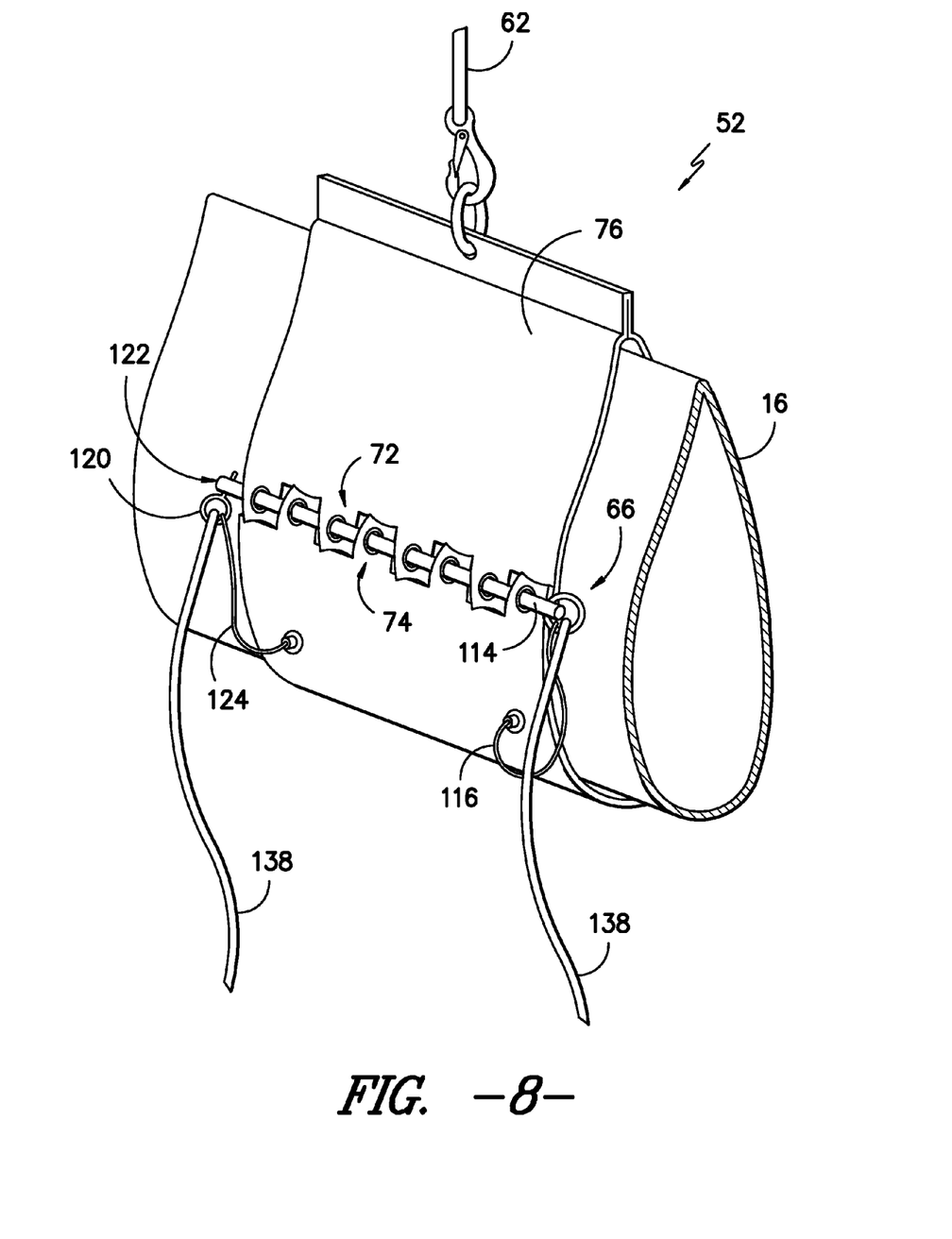

As shown in FIGS. 4 through 8, the sling 64 of a lift device 52 may in some embodiments be coupled to a rotor blade 16. For example, the sling 64 may include a first end 72 and a second end 74 spaced apart by an intermediate portion 76. The intermediate portion 76 may be a unitary structure between the first end 72 and second end 74, or may include a plurality of sections connected together to form the intermediate portion 76. The sling 64 may include, for example, a rope as shown in FIGS. 4 through 7, or a sheet such as a canvas or other suitable fabric or material as shown in FIG. 8. The sling 64 may support the rotor blade 16 such that the rotor blade 16 may be lifted by the lift device 52. Thus, as shown, at least a portion of the intermediate portion 76 may contact one or more exterior surfaces of the rotor blade 16 when the sling 64 is coupled to the rotor blade 16.

The second end 74 according to the present disclosure is releasably joined to the first end 72 by the quick release device 66. Thus, when the second end 74 and first end 72 are joined together, the sling 64 and lift device 52 may be coupled to the rotor blade 16. When the second end 74 is released from the first end 74, however, the sling 64 and lift device 52 may be uncoupled from the rotor blade 16. When uncoupled from the rotor blade 16, the sling 64 and lift device 52 no longer support the rotor blade 16 and are movable independently of the rotor blade 16. Additionally, uncoupling of the sling 64 and lift device 52 from the rotor blade 16 according to the present disclosure may advantageously be in a perimeter-wise fashion, about the perimeter of the rotor blade at any suitable span-wise location, rather than in a span-wise fashion, which requires movement of the lift device 52 in a span-wise direction.

Figure 4:
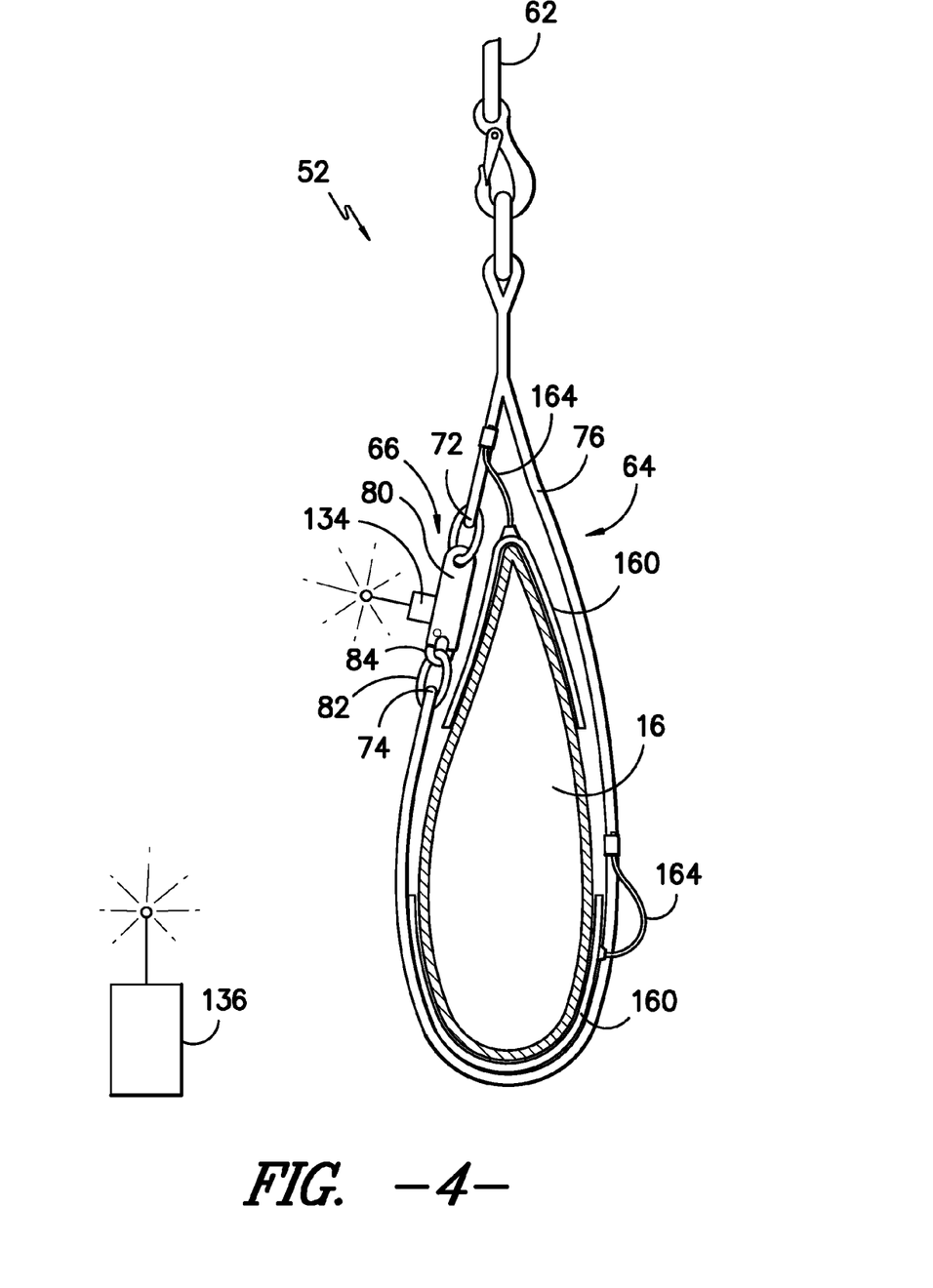
FIG. 4 is a cross-sectional view of a lift system coupled to a rotor blade according to one embodiment of the present disclosure.
Figure 5:
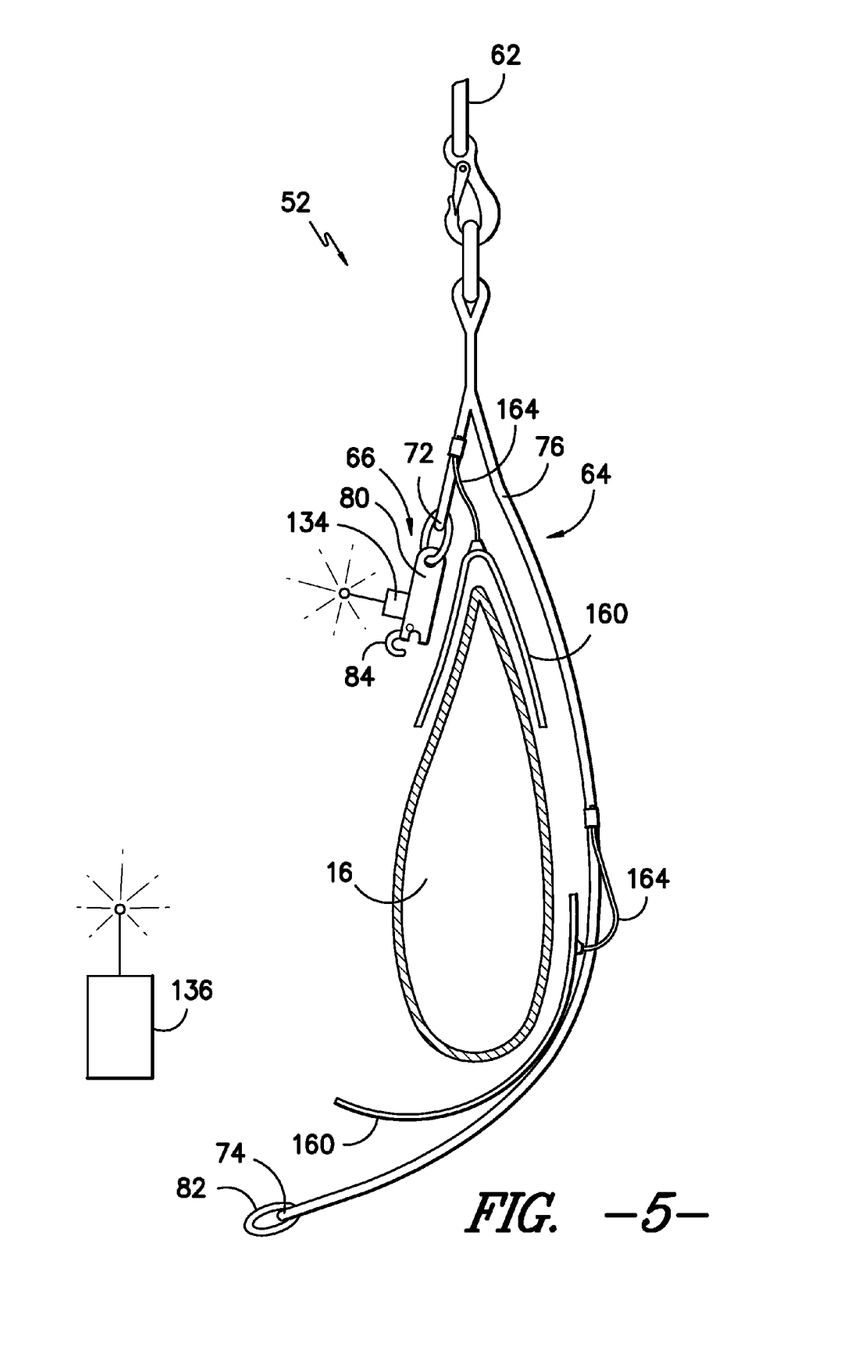
FIG. 5 is a cross-sectional view of the lift system of FIG. 4 uncoupled from the rotor blade.

The quick release device 66 may be operable to release the second end 74 from the first end 76 to uncouple the sling 64, and thus the lift device 52, from the rotor blade 16. FIGS. 4 and 6 through 8 illustrate various embodiments of a sling 64 coupled to a rotor blade 16, while FIG. 5 illustrates one embodiment of a sling 64 uncoupled from a rotor blade 16.

A quick release device 66 according to the present disclosure may be any suitable device that may join the second end 74 and first end 72 together and further be operable to release the second end 74 from the first end 72. For example, FIGS. 4 and 5 illustrate one embodiment of a quick release device 66. In this embodiment, the quick release device 66 comprises a quick release latch 80 and a shackle 82. The quick release latch 80 is connected to the first end 72 or the second end 74, while the shackle 82 is connected to the other of the first end 72 or the second end 74. The shackle 82 may be releasably joined to the quick release latch 80, as shown. For example, the quick release latch 80 may include a hook 84. The hook 84 may be movable between a closed position and an open position. In the closed position, as shown in FIG. 4, the hook 84 may secure the shackle 82 and the quick release latch 80 together. In the open position, as shown in FIG. 5, the hook 84 may release the shackle 82 from the quick release latch 80. Thus, operation of the quick release latch 80 may release the shackle 82 therefrom, thus, releasing the second end 74 from the first end 72.

In another embodiment, as shown in FIG. 7, the quick release device 66 may include a quick release knot 90. For example, the first end 72 and the second end 74 may be tied together to form the knot 90, thus releasably joining the second end 74 to the first end 72. Pulling on the first end 72 or the second end 74 may untie the knot 90, thus, releasing the second end 74 from the first end 72 and uncoupling the sling 64, and thus the lift device 52, from the rotor blade 16.

In another embodiment, as shown in FIG. 6, the quick release device 66 may include a first hinge portion 100, a second hinge portion 102, and a removable pin 104. The first hinge portion 100 may be connected to the first end 72 or the second end 74, while the second hinge portion 102 is connected to the other of the first end 72 or the second end 74. The releasable pin 104 may be inserted through bore holes 106 defined in the first hinge portion 100 and second hinge portion 102, releasably joining the second hinge portion 102 to the first hinge portion 100 and thus releasably joining the second end 74 to the first end 72. Removal of the releasable pin 104 from within the bore holes 106 releases the second hinge portion 102 from the first hinge portion 100, thus releasing the second end 74 from the first end 72 and uncoupling the sling 64, and thus the lift device 52, from the rotor blade 16. In some embodiments, the releasable pin 104 may be connected to the lift device 52, such as by a tether (not shown).

In some embodiments, as further shown in FIG. 6, the second end 74, first end 72, and quick release device 66 form a choke. Thus, when coupled together, the quick release device 66 and second end 74 generally tighten around the rotor blade 16 and with respect to the first end 74. Thus, the sling 64 may be a choke sling, as shown.

In another embodiment, as shown in FIG. 8, the quick release device 66 may include one or more first apertures 110, one or more second apertures 112, and a removable pin 114. The first apertures 110 may be defined in the sling 64 adjacent the first end 72 or the second end 74, while the second apertures 112 are defined in the sling 64 adjacent the other of the first end 72 or the second end 74. The releasable pin 114 may be inserted through apertures 110 and 112, releasably joining the second end 74 to the first end 72. Removal of the releasable pin 114 from within the apertures 110 and 112 releases the second end 74 from the first end 72, uncoupling the sling 64, and thus the lift device 52, from the rotor blade 16. In some embodiments, the releasable pin 114 may be connected to the lift device 52, such as by tether 116, as shown.

In some embodiments, as shown in FIG. 8, the lift system 50 may further include a removable safety device 120. The safety device 120 may be, for example, a pin, lock, or other suitable device that is releasably joined to the quick release device 66. The safety device 120, when joined to the quick release device 66, impedes operation of the quick release device 66. Thus, the safety device 120 may prevent the quick release device 66 from prematurely operating and uncoupling the sling 64 from the rotor blade 16. Removal of the safety device 120 may allow the quick release device 66 to operate as discussed above. The safety device 120 may be remotely or manually released, as discussed below.

For example, in the embodiment as shown in FIG. 8, the removable safety device 120 is a removable pin. The pin is inserted through bore hole 122 defined the removable pin 114, and thus prevents the pin 114 from being removed from the apertures 110 and 112. Removal of the pin may again allow the removable pin 114 to be removed from the apertures 110 and 112, and thus allows the quick release device 66 to operate.

Additionally, in some embodiments, the safety device 120 may be connected to the lift device 52, such as by tether 124 as shown.

In some embodiments, the quick release device 66 includes a remote release 130, while in other embodiments, the quick release device 66 includes a manual release 132. The remote release 130 may include any suitable devices or components that allow for indirect control of the quick release device 66. For example, FIGS. 4 and 5 illustrate one embodiment of a remote release 130. The remote release 130 includes an actuator 134 and a controller 136. The actuator 134 may be connected to the quick release device 66, and may operate the quick release device 66 based on input from the controller 136. The actuator 134 may include, for example, a pneumatic or hydraulic cylinder, gears, cams, electronic sensors, and/or other suitable actuating mechanisms for operating the quick release device 66 as desired or required. The controller 136 and actuator 134 may be communicatively coupled through, for example, a physical coupling, such as through a wire or other conduit or umbilical cord, or through a wireless coupling, such as through an infra-red, cellular, sonic, optical, or radio frequency based coupling. The controller 136 may be incorporated into a suitable control system (not shown), such as a handheld remote, a personal digital assistant, cellular telephone, a separate pendant controller, or a computer. The actuator 134 may be operated manually through the controller 136 by a human operator, or may be partially or fully automated through the use of suitable programming logic incorporated into the controller 136. Further, the controller 136 may include suitable processing apparatus and software for operating the actuator 134 as desired or required.

FIGS. 6 through 8 illustrate one embodiment of a manual release 132. The manual release 132 may include any suitable devices or components that allow for direct control of the quick release device 66. The manual release 130 according to this embodiment includes a tag line 138. One end of the tag line 138 is connected to the quick release device 66, while the other end hangs from quick release device 66. Pulling on or otherwise manipulating the tag line 138 may operate the quick release device 66, as discussed above.

In some embodiments, a blade appendage 150 is configured on an exterior surface of the rotor blade 16. The blade appendage 150 may be, for example, a noise reducer as shown in FIGS. 2 and 3, a lighting receptor, or vortex generator, or any other suitable external feature mounted to or extending from an exterior surface of the rotor blade 16. The lift device 52 according to the present disclosure may advantageously prevent damage to blade appendages 150 configured on the rotor blade 16 during uncoupling of the lift device 52 from the rotor blade 16. For example, a lift device 52 according to the present disclosure may not require sliding in a generally span-wise direction towards and past the tip 32 of the rotor blade 16 to be uncoupled from the rotor blade 16. Rather, a quick release device 66 as disclosed above may be operated to uncouple the lift device 52 from the rotor blade 16. The quick release device 66 and lift device 52 according to the present disclosure advantageously reduce or eliminate the risk of damage to the rotor blade 16 or blade appendages 150 thereon during such uncoupling.

In some embodiments, as shown in FIGS. 4 and 5, one or more removable caps 160 may be positioned between the lift device 52, such as the sling 64, and the rotor blade 16. For example, a removable cap 160 may be positioned between the lift device 52 and the leading edge 26 and/or between the lift device 52 and the trailing edge 28. The removable caps 160 may be formed from a fabric, a plastic, or any other suitable material, and may be provided to protect the exterior surfaces of the rotor blade 16 from damage due to contact with the lift device 52. A removable cap 160 may be removed from between a lift device 52 and rotor blade 16 by, for example, pulling on a tag line (not shown) connected to the removable cap 160 after uncoupling the lift device 52 and the rotor blade 16. Additionally or alternatively, a removable cap 160 may be removed due to removal of a lift device 52 due to, for example, a connection between the removable cap 160 and the lift device 52.

In some embodiments, a removable cap 160 is independent from a lift device 52, and is thus removable separately from the lift device 52. In other embodiments, the removable cap 160 is connected to the lift device 52, such as by tethers 164 as shown in FIGS. 4 and 5, and may thus be removable in conjunction with the lift device 52.

The present disclosure is further directed to a method for constructing a wind turbine 10. The method includes, for example, coupling a sling 64 to a rotor blade 16. The method further includes lifting the rotor blade 16 to a desired position. The desired position may be, for example, any suitable location along the height of the tower 12. The method further includes releasing a second end 74 of the sling 64 from a first end 72 of the sling 64. Such releasing uncouples the sling 64 from the rotor blade 16.

In some embodiments, the releasing step includes remotely actuating a quick release device 66, as discussed above. In other embodiments, the releasing step includes manually actuating the quick release device 66, as discussed above.

The present method may further include, for example, connecting the rotor blade 16 to a tower 12. The rotor blade 16 may be connected using any suitable devices and components, such as mechanical fasteners or other suitable connecting components.

The present method may additionally include coupling a main lift device 54 to a hub 18, and may further include uncoupling the main lift device 54 from the hub 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lift system for a wind turbine, the lift system comprising:
   a rotor blade having exterior surfaces defining a pressure side, a suction side, a leading edge, and a trailing edge extending in a generally span-wise direction between a tip and a root; and,
   a lift device comprising a sling and a quick release device, the sling formed from a generally flexible material and coupled to the rotor blade and comprising a first end and a second end spaced apart by an intermediate portion, the second end releasably joined to the first end by the quick release device, the quick release device operable to release the second end from the first end to uncouple the sling from the rotor blade.

2. The lift system of claim 1, wherein the quick release device comprises a remote release.

3. The lift system of claim 1, wherein the quick release device comprises a manual release.

4. The lift system of claim 1, wherein the quick release device comprises a quick release latch connected to the first end and a shackle connected to the second end, and wherein the shackle is releasably joined to the quick release latch.

5. The lift system of claim 1, wherein the quick release device comprises a quick release knot.

6. The lift system of claim 1, wherein the quick release device comprises a first hinge portion connected to the first end, a second hinge portion connected to the second end, and a removable pin releasably joining the second end to the first end.

7. The lift system of claim 1, wherein the quick release device comprises a first aperture defined adjacent the first end, a second aperture defined adjacent the second end, and a removable pin releasably joining the first aperture and the second aperture.

8. The lift system of claim 1, further comprising a removable safety device releasably joined to the quick release device, the safety device impeding operation of the quick release device.

9. The lift system of claim 1, further comprising a blade appendage configured on an exterior surface of the rotor blade.

10. The lift system of claim 1, wherein the lift device further comprises a crane and a crane cable, the crane cable connected to the crane and one of the sling or the quick release device for lifting the rotor blade.

11. The lift system of claim 1, further comprising a hub, the root of the rotor blade mounted to the hub.

12. The lift system of claim 11, wherein the lift device is an auxiliary lift device, and further comprising a main lift device coupled to the hub.

13. The lift system of claim 1, further comprising a removable cap positioned between the sling and one of the leading edge or the trailing edge of the rotor blade.

14. The lift system of claim 13, wherein the removable cap is connected to the lift device.

15. A method for constructing a wind turbine, the method comprising:
   coupling a sling to a rotor blade, the rotor blade having exterior surfaces defining a pressure side, a suction side, a leading edge, and a trailing edge extending in a generally span-wise direction between a tip and a root, the sling formed from a generally flexible material and comprising a first end and a second end spaced apart by an intermediate portion, the second end releasably joined to the first end;
   lifting the rotor blade to a desired position; and,
   releasing the second end of the sling from the first end such that the sling is uncoupled from the rotor blade.

16. The method of claim 15, wherein the releasing step comprises remotely actuating a quick release device.

17. The method of claim 15, wherein the releasing step comprises manually actuating a quick release device.

18. The method of claim 15, further comprising connecting the rotor blade to a tower.

19. The method of claim 15, further comprising coupling a main lift device to a hub, the root of the rotor blade mounted to the hub.

20. The method of claim 19, further comprising uncoupling the main lift device from the hub.

* * * * *